United States Patent [19]
Gahagan

[11] 3,923,437
[45] Dec. 2, 1975

[54] APPARATUS FOR INSERTING FILLING IN BREAD
[76] Inventor: Frederick G. Gahagan, 255 Bayville Road, Locust Valley, N.Y. 11959
[22] Filed: Nov. 7, 1973
[21] Appl. No.: 413,527

[52] U.S. Cl. .......... 425/130; 249/141; 249/DIG. 1; 99/450.8; 425/134
[51] Int. Cl.² .......................................... A21D 2/00
[58] Field of Search ........... 249/141, 121; 99/450.8, 99/450.6, 432, 532, 533; 220/345; 425/134, 130, 450.8

[56] References Cited
UNITED STATES PATENTS
646,283    3/1900   Heatly ............................ 220/345 X
1,777,830  10/1930  Estrin ............................. 99/450.8
2,452,846  11/1948  Flynn .............................. 249/141
3,465,693  9/1969   Lopata ............................ 99/450.8
3,762,849  10/1973  Claes ............................. 425/190

Primary Examiner—Francis S. Husar
Assistant Examiner—David S. Safran
Attorney, Agent, or Firm—Brumbaugh, Graves, Donohue & Raymond

[57] ABSTRACT

The pan includes a port in one wall which is covered by a door that may be selectively opened and closed. The port allows a filling probe to be inserted into dough within the pan. Also disclosed is a method of inserting a filler material into bread dough prior to baking the bread involving opening a door covering a port in the end wall of a bread pan, inserting a filling probe through the port into the dough, and injecting a filling material through the probe into the dough.

6 Claims, 6 Drawing Figures

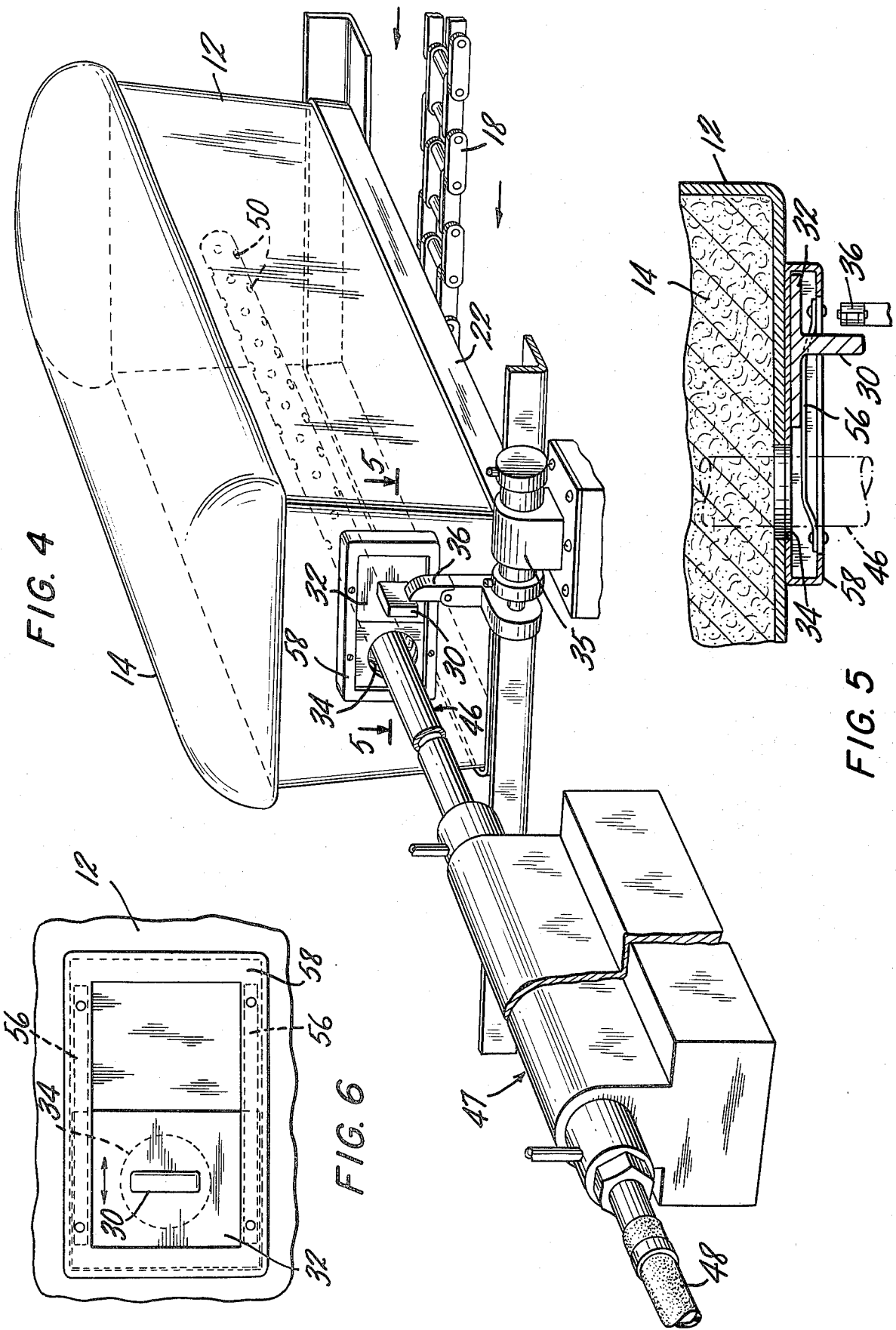

3,923,437

APPARATUS FOR INSERTING FILLING IN BREAD

BACKGROUND OF THE INVENTION

The present invention relates to bread pans and more particularly relates to a bread pan adapted for use with a filling probe which allows for the insertion of the probe into dough placed within the pan prior to baking.

The invention further relates to the method of inserting a filling material into dough prior to baking.

A conventional bread pan comprises the well known form of a rectangular pan. Such pans have long been known and used in the bread baking art. It has been found that when such pans have been filled with dough which has been allowed to rise and then the top of the dough is slit, butter may be brushed into the slit prior to baking in order to obtain a product sometimes called butter topped bread.

Also known in the prior art are various procedures to inject different fillings into bakery products following the baking of such products. Typical products are jelly doughnuts, cream puffs, and eclairs.

Heretofore, however, there has been no way to provide filling material in the core of unbaked bread dough.

SUMMARY OF THE INVENTION

A bread pan adapted for insertion of a filler tube comprises a pan having a bottom and side walls. A port extends through one side wall of the pan, and means for selectively opening and closing the port, such as a sliding door, normally covers the port.

The method of inserting a filling material within a bakery product prior to baking comprises the steps of placing the dough for the product in a pan having a port covered by a normally closed door. The door is opened and a filling probe is inserted through the port into the core of the dough. A filler material is injected into the dough. The probe is then removed and the door is closed.

BRIEF DESCRIPTION OF THE DRAWINGS

In the Drawings:

FIG. 4 is a perspective view showing a pan of bread at a filler station with a filling probe inserted through the port of the bread pan of the present invention;

FIG. 5 is a top view of the sliding door mechanism of the bread pan of the present invention; and FIG. 6 is a side view of the sliding door mechanism which is used with the present invention.

DETAILED DESCRIPTION OF THE PREFERRED EMBODIMENT

Figure 1:
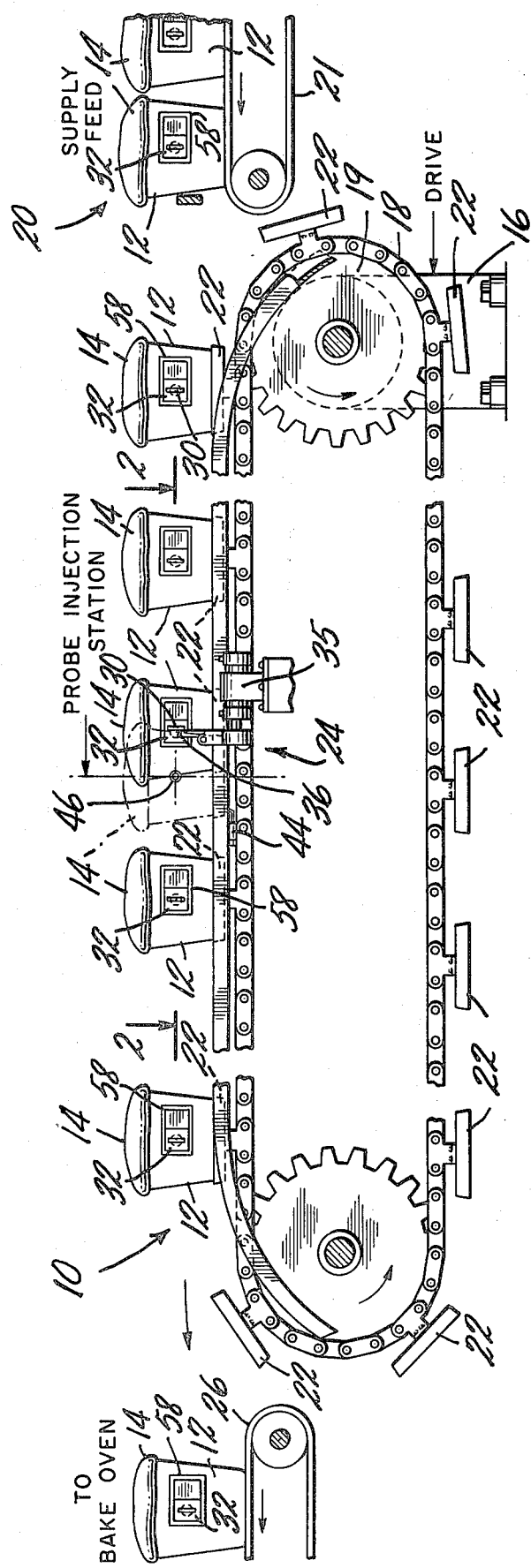
FIG. 1 is a side view of an assembly line used for inserting a filler material into bread dough prior to baking.

Referring generally to FIG. 1, an assembly line 10 adapted for use with the present invention is shown. On the assembly line 10 a number of the bread pans 12 of the present invention are shown. Each of the pans 12 is filled with bread dough 14.

The assembly line 10 comprises a motorized drive unit 16 attached to a drive gear 19 which engages and drives an endless chain 18. A number of pan carriers 22 are attached to the chain 18 and spaced apart thereon. Pans 12 filled with bread dough 14 are delivered to the assembly line 10 by a supply feed 20 comprising an endless belt 21. The pans 12 from the supply feed 20 are each deposited in turn upon one of the pan carriers 22 to be carried along the assembly line 10 to a probe injection and filler station 24, shown more fully in FIG. 2. There, the dough 14 is injected with a filler material, as will be more fully explained hereinafter. The filled pans 12 are then carried along the assembly line 10 to a conveyor belt 26 which takes the pans 12 filled with dough 14, now injected with a filler material, to a bake oven (not shown) for baking.

Referring generally to FIGS. 5 and 6, the bread pan 12 of the present invention is shown to be a substantially rectangular pan with an opening or port 34 extending through an end wall. The port 34 is covered by a sliding door 32 having a handle 30 which extends outwardly away from the wall of the pan 12. The sliding door 32 is held in place by spring type retaining members 56, mounted on a sliding door retaining housing 58 which urges the door 32 against the wall of the pan 12. The retaining member 56 allows the door 32 to slide within its housing 58 to selectively open and close the port 32.

Figure 3:
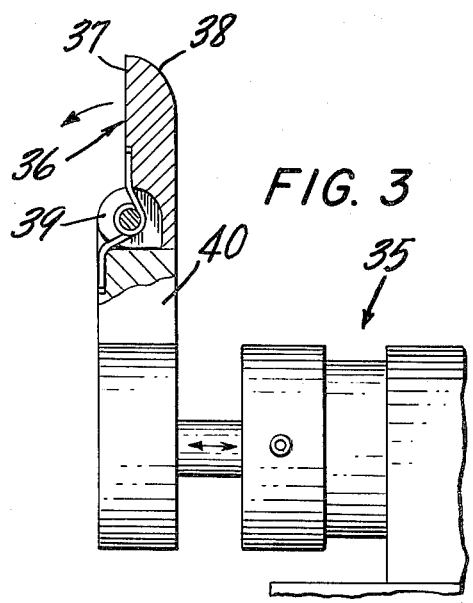
FIG. 3 is a side view of a door actuating mechanism used in conjunction with the present invention.

In FIG. 3 a door actuating mechanism 35 comprises a finger 36 having a flat front surface 37 and a curved back surface 38. The finger 36 is attached to an arm 40 of the mechanism 35 by a spring loaded hinge 39. The arm 40 is adapted to be hydraulically extended away from the main body of the mechanism 35.

Figure 2:
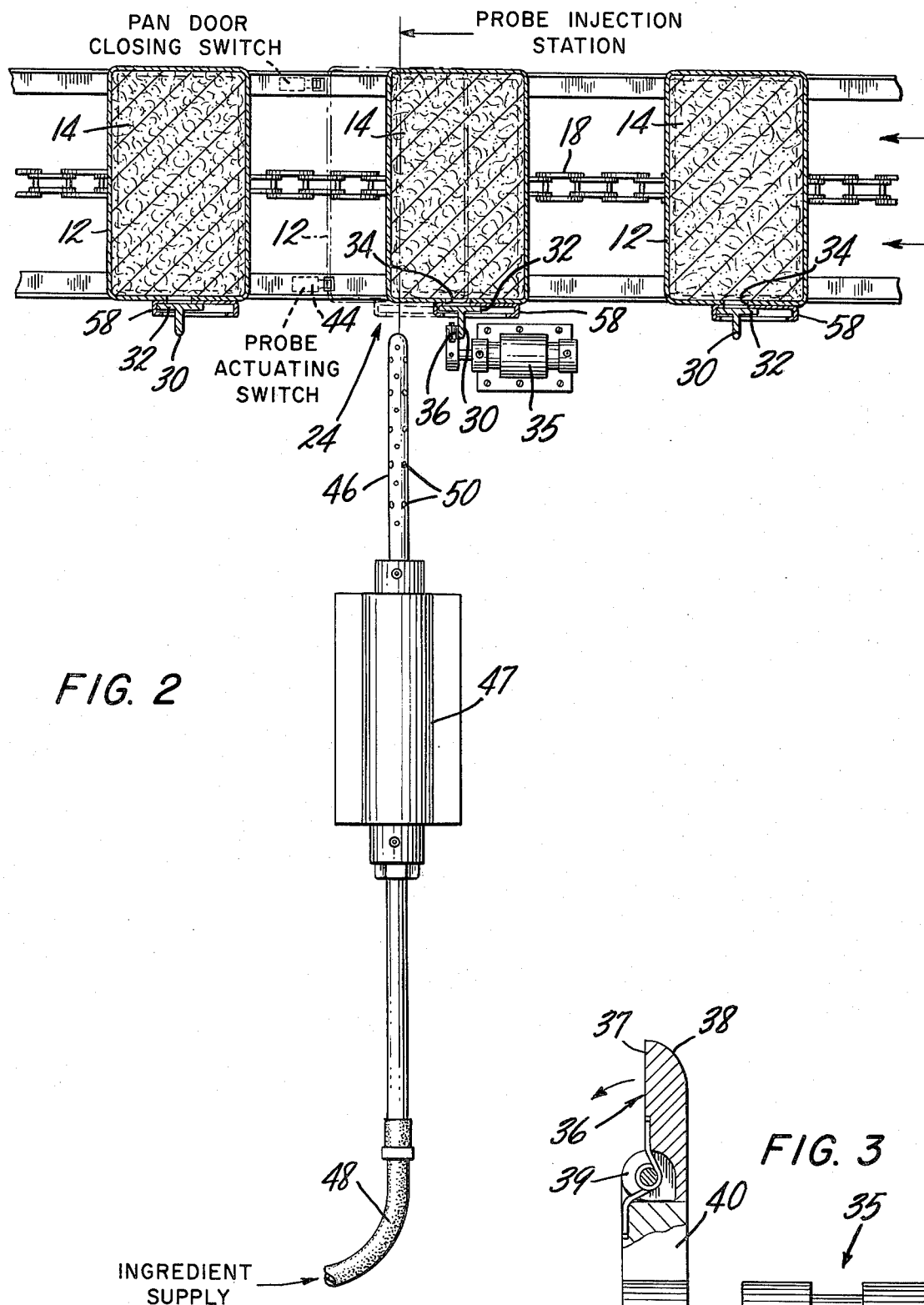
FIG. 2 is a top view of a portion of FIG. 1 showing a probe injection and filler station.

Referring now generally to FIGS. 2 and 4, the operation of the probe injection and filler station 24 can be more fully explained. When a pan 12 filled with dough 14 arrives at the probe injection and filler station 24, the handle 30 of the sliding door 32 contacts the curved back surface 38 of the finger 36. This causes movement of the door 32 to expose and open the port 34 in the end wall of the pan 12, as the pan 12 continues to move. The travel of the door 32 will be limited when the door reaches the end of the housing 58. Additional movement of the pan 12 and pressure from the handle 30 will cause the finger 36 to bend at the hinge 39, and the handle 30 to slide over the covered surface 38 of the finger 36. The pan 12 will then reach the probe actuating switch 44 mounted on the assembly line 10. The port 34 will be completely exposed and will be aligned with a hydraulically actuated filling probe 46. The contact with the probe actuating switch 44 causes the drive unit 16 to stop. The filling probe 46 is then hydraulically inserted through the port 34 by the actuating mechanism 47 and into the core of the dough 14 within the pan 12. A filler material or ingredient is then injected through a series of spaced holes 50 along the length of the probe 46 and into the core of the dough 14. The spaced holes facilitate diffusion of the filler material into the dough. This filler material is supplied to the probe 46 under pressure through a supply line 48 from a reservoir (not shown).

Following the injection of the filler material the hydraulic mechanism 47, which actuates the probe 46, withdraws the probe 46 from the pan 12 and the drive unit 16 restarts.

The pan carrier 22 carrying the pan 12 holding the dough 14 which has just been filled will contact the pan door closing switch 54 immediately after the drive unit 16 has recommenced movement. This switch 54 causes the door actuating mechanism 35 to extend arm 40 so that the flat surface 37 of the finger 36 is pushed against the handle 30 of the sliding door 32 thereby closing the door 32 and covering the port 34. The pan 12 holding the now filled dough 14 is then carried along the assembly line 10 to the conveyor belt 26 to the bake oven as heretofore described.

The filling probe 46 is preferably designed to have a length somewhat longer than the length of the bread pan 12 with which it will be used. The spaced holes 50 extend along a length of the probe 46 for a distance approximating the length of the pan 12. Thus, when the probe 46 is fully inserted through the port in the end wall of a bread pan 12 and a filler material is injected into the dough 14, the filler material will saturate the core throughout the length of the dough 14. Following the baking of bread which has been prepared in this manner the filling will extend through the center section of each slice of bread.

I claim:

1. Apparatus for inserting filler material in bread comprising:
   a. an elongated pan having a bottom and side walls, two of said side walls being shorter than the other two of said side walls, said pan being adapted to be filled with dough;
   b. a port extending through a substantially central area of a short side wall of said pan;
   c. means for selectively covering and uncovering said port; and
   d. a filler probe positioned so as to be inserted through said port when said port is in an uncovered position.

2. The apparatus of claim 1 wherein said means comprises a door which covers said port.

3. The apparatus of claim 2 wherein said door is a sliding door and is held in a housing attached to said side wall having said port.

4. The apparatus of claim 3 wherein said sliding door further comprises a handle which extends outwardly from said pan.

5. The apparatus of claim 1 wherein said filler probe has an overall length greater than the length of the longer of said side walls.

6. The apparatus of claim 1 wherein said filler probe has a series of holes spaced along its length to diffuse filler material throughout dough within said pan.

* * * * *